United States Patent [19]
Mori et al.

[11] 4,393,858
[45] Jul. 19, 1983

[54] COMBUSTION CONTROL SYSTEM

[75] Inventors: Keiichi Mori, Izumiohtsu; Yasukiyo Ueda; Keijiro Mori, both of Nara, all of Japan

[73] Assignee: Matsushita Electric Industrial Co., Ltd., Osaka, Japan

[21] Appl. No.: 100,529

[22] Filed: Dec. 5, 1979

[30] Foreign Application Priority Data

Dec. 11, 1978 [JP] Japan .................................. 53-153498
Dec. 11, 1978 [JP] Japan .................................. 53-153499
Dec. 12, 1978 [JP] Japan .................................. 53-153926

[51] Int. Cl.³ .............................................. F24H 1/00
[52] U.S. Cl. ................................... 126/351; 237/8 R; 236/15 BR; 431/12; 126/116 A
[58] Field of Search .............. 126/351, 116 A; 431/12; 236/15 BB, 15 BR, 1 E, 1 A, 20, 20 A, 91 G, 91 F, 15 BF; 237/8 R; 137/90, 94, 98

[56] References Cited
U.S. PATENT DOCUMENTS 2,736,498 2/1956 Brummerhoff ...................... 126/351
2,874,906 2/1959 Nossen ............................ 236/15 BR
3,011,709 12/1961 Jacoby ............................ 236/15 BR
3,822,039 7/1974 Mori et al. ........................ 237/8 R X
4,033,712 7/1977 Morton ............................ 431/12 X
4,108,375 8/1978 Keeney ........................... 236/91 F X
4,109,639 8/1978 Keegan ........................... 126/422 X
4,182,484 1/1980 Stanke et al. ..................... 236/91 F
4,293,027 10/1981 Tepe et al. ........................ 165/28 X Primary Examiner—Larry Jones
Attorney, Agent, or Firm—Barnes, Kisselle, Raisch, Choate, Whittemore & Hulbert

[57] ABSTRACT

A combustion control system having incorporated therein an electronic circuit for driving and controlling a proportional control valve provided on a fuel supply line to control the amount of combustion and thereby maintain the temperature of fluid to be heated by combustion at a constant level even when the amount of the fluid varies per unit time. The output voltage of a bridge circuit including a sensor for detecting the temperature of the fluid as a component is fed to operation amplifiers for differentiating, integrating and proportional amplification to control the control valve with the resulting output. The system is best suited for use in instantaneous water heaters.

5 Claims, 26 Drawing Figures

COMBUSTION CONTROL SYSTEM

This invention relates to a combustion control system, and more particularly to a system for controlling combustion with use of a proportional control valve operable by an electronic circuit. Such a combustion control system is useful, for example, for water heaters adapted to supply hot water with its temperature controlled to a specified value at the outlet of a heat exchanger.

When a shower bath or the like is used with the hot water supplied by a conventional instantaneous water heater, the rate of flow of the hot water having a suitable temperature is definite, such that if the flow rate is altered, the temperature of the hot water varies greatly along the capacity curve of the water heater. The water heater is therefore inconvenient to use.

With the development of proportional control valves for fuels, water heaters of the proportional control type are made commercially available in which the amount of gas to be burned is controlled in accordance with the temperature of water detected at the outlet of the heater so as to maintain the temperature at a constant level. The water heater affords hot water approximately at a constant temperature even when the flow rate is varied provided that the heater is used within its maximum capacity. The heater nevertheless still involves an offset of the water temperature. Further when the load is altered, the transient characteristics of the heater involve marked overshoot due to a delay involved in the heater or temperature sensor. The performance of the heater still remains to be improved especially for use with a shower bath because the water supplied feels too hot if heated to a level even 1° C. higher than an appropriate temperature and could cause the hazard of burning.

The main object of this invention is to provide a combustion control system incorporating an electronic control circuit for detecting the temperature of the material heated by combustion and controlling the amount of the combustion in accordance with the detected temperature so as to maintain the temperature at a specified value, the control circuit being adapted to compensate for a delay in the response of the heating unit or the temperature sensor to afford improved static control characteristics and improved transient characteristics.

To filfill this object, the invention provides a system which has incorporated therein a bridge circuit including a temperature sensor as a component thereof and in which the output voltage of the bridge circuit is fed to operation amplifiers for proportional, integrating and differentiating amplification to control the amount of combustion with the resulting output.

As a preferred embodiment, the invention provides a system in which when the load is abruptly decreased entailing overshoot, the potential charged in an integration capacitor included in an integration circuit is discharged to thereby shorten the duration of the overshooting that would otherwise be prolonged by the influence of the integration circuit, the amount of discharge further being limited to reduce the undershoot due to overdischarge and the duration of undershooting.

The overshoot peak temperature, as well as the overshooting time, can be decreased by closing a proportional control valve simultaneously with the discharge of the integration capacitor upon a reduction of the load.

As another preferred embodiment, the invention provides a system in which overcharging of the integration capacitor is prevented during use in the range of maximum capacity to thereby decrease the overshoot that will occur over a prolonged period of time at high temperatures during excursion to the control range.

As another preferred embodiment, the invention provides a system in which the output of a differentiation is further differentiated once again to give a temporarily increased modified output relative to the amount of variation of the load and to thereby decrease the overshoot resulting from the variation of the load.

Other features and advantages of the invention will become apparent from the following description of the preferred embodiments with reference to the accompanying drawings, in which.

Figure 1:
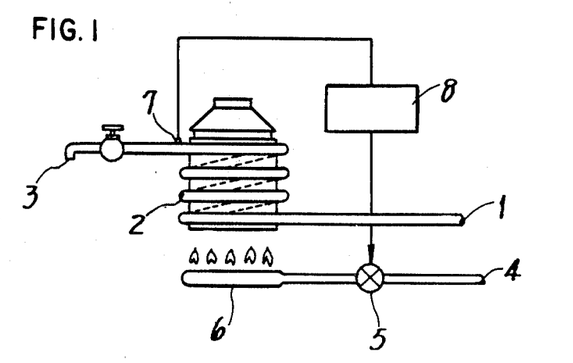
FIG. 1 is a diagram showing a control system for a water heater to which the invention is applied.

FIG. 1 schematically shows a control system for a gas water heater. Water is fed through an inlet 1 heated by a heat exchanger 2 and run off from a faucet 3 for use. Gas is supplied from an inlet 4, passed through a proportional control valve 5 and burned by a burner 6 to heat exchanger 2. A temperature sensor 7 disposed at the outlet of the heat exchanger 2 detects the temperature of the hot water and feeds a temperature signal to a control circuit 8. The temperature signal is compared and amplified in the control circuit 8, which gives output to the proportional control valve 5. The valve 5 is adapted to proportionally control the rate of flow of the gas in accordance with the current I through an electromagnetic winding.

In the description to follow and throughout the accompanying drawings, like parts are referred to by like reference numerals.

Figure 2:
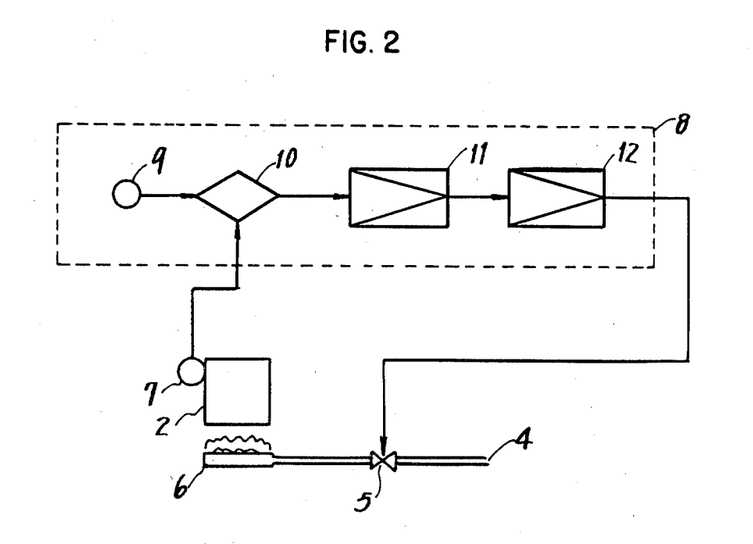
FIG. 2 is a block diagram showing a first embodiment of control circuit.

FIG. 2 is a block diagram showing the control circuit 8. The circuit includes a comparator circuit 10 which compares the signal from the temperature sensor 7 with a temperature setting 9. The output from the circuit 10 is amplified in a proportional differentiation amplifier circuit 11 and then in a proportional integration amplifier circuit 12, which gives output to the proportional control valve 5 as a drive signal. The control valve 5 controls the amount of combustion of the burner 6 so that the temperature detected by the sensor 7 will be equal to the setting 9. Thus the circuit 8 is a closed-loop circuit.

Figure 3:
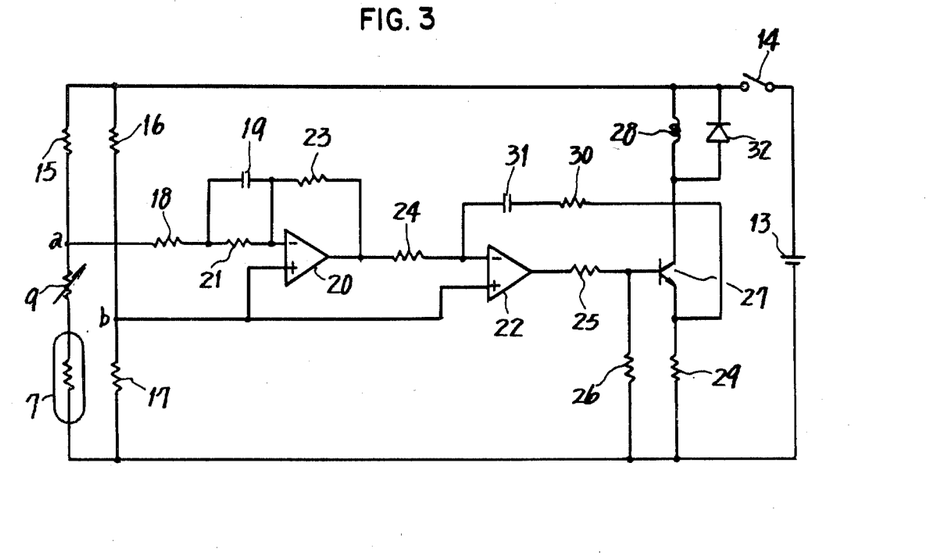
FIG. 3 is a diagram more specifically showing the circuit of FIG. 2.

FIG. 3 shows the control circuit 8 in greater detail. A d-c power supply 13 energizes the circuit through a water supply switch 14 which is closed simultaneously with the start of supply of water. The temperature sensor 7 is a negative-characteristic temperature-sensitive resistance element (hereinafter referred to as "sensor"). The sensor 7, a variable resistor 9 for setting the temperature and resistors 15, 16, 17 form a bridge circuit, an intermediate point a of which is connected via a resistor 18 and a capacitor 19 to the negative input terminal of an operation amplifier 20. A resistor 21 is connected in parallel with a capacitor 19. Another intermediate point b of the bridge is connected to the positive input terminals of the amplifier 20 and an operation amplifier 22. The output terminal of the amplifier 20 is connected to its negative input terminal via a feedback resistor 23 and is also connected to the negative input terminal of the operation amplifier 22 by way of a resistor 24. The output of the amplifier 22 is passed through resistors 25 and 26 for voltage division, the intermediate point of which is connected to the base of a transistor 27. The collector of the transistor 27 is connected to the positive terminal of the power supply 13 through the winding 28 of the control valve 5. The emitter is connected to the negative terminal of the power supply via an emitter resistor 29 and to the amplifier 22 for feedback through a resistor 30 and a capacitor 31. Indicated at 32 is a diode for absorbing the counter electromotive force of the winding 28. With the above circuit construction, the amplifier 20 provides the proportional differentiation circuit 11 along with the resistors 18, 21, 23 and the capacitor 19, and the amplifier 22 constitutes the proportional integrating circuit 12 along with the resistors 24, 30 and the capacitor 31.

When the temperature of the outflowing hot water drops due to an increase in the load, the resistivity of the sensor 7 increases. This gives a higher potential at the point a, producing a potential difference between the points a and b. Consequently the capacitor 19 is charged through the resistor 18, causing the amplifier 20 to produce a differentiated output with a gain determined by the resistors 23 and 18. When the capacitor 19 has been completely charged, the amplifier gives proportional output with a gain determined by the sum of the values of the resistors 23 and 18. Thus the amplifier produces proportional differentiated output on reversion in accordance with the variation of the temperature.

This output is fed to the amplifier 22, which delivers output with a gain dependent on the resistors 30 and 24. The capacitor 31 is charged by the integration circuit having a time constant determined by the capacitor 31 and the resistor 24 until the potential at a becomes equal to that at b, namely, until the temperature of water returns to the original level. The output of the amplifier 22 drives the transistor 27 through the resistor 25, thereby controlling the current through the winding 28 of the valve 5.

For the potential at a to be equal to the potential at b when the resistivity of the variable resistor 9 is increased, the resistivity of the sensor 7 must become smaller by an amount corresponding to the increase in the resistivity of the variable resistor. For the sensor 7 to have a reduced resistivity, the temperature of the sensor must be higher since the sensor 7 is a negative-characteristic temperature-sensitive resistance element. Thus the variable resistor 9 gives the desired temperature setting.

When the load is decreased, a reverse operation to the above is performed.

Figure 4:
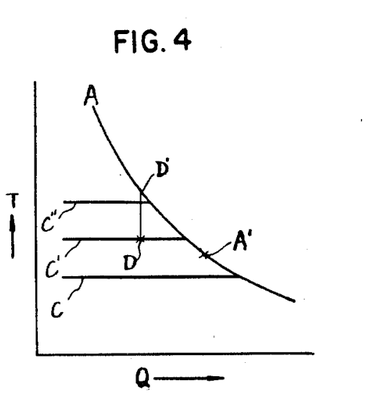
FIG. 4 is a diagram showing the control characteristics of the water heater according to the invention.
Figure 5:
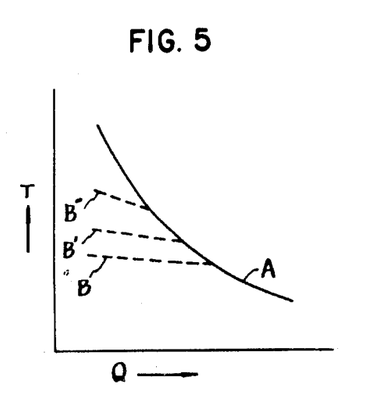
FIG. 5 is a diagram showing the characteristics of a conventional water heater provided with a proportional control system.

FIG. 4 shows the hot water supply characteristics. The hot water supply by the heater is plotted as abscissa Q vs. the temperature of the hot water as ordinate T. FIG. 5 shows the hot water supply afforded solely by proportional amplification control. Curves A in FIGS. 4 and 5 represent the maximum capacity characteristics of the heaters. The heaters are controlled over the range below the curves. At temperature settings B, B' and B" in FIG. 5, the temperature of the hot water decreases due to offset with an increase in the hot water supply Q. The decrease of the temperature can be reduced by increasing the gain of proportional amplification, but unstable control will then result with the likelihood of hunting. With the proportional differentiation and integration control system of the invention, the integration circuit effects compensation to eliminate the deviation involved even with a low proportional gain, with the result that the temperature of the water can be maintained at a constant level at settings C, C' and C" independently of the quantity of the water.

Figure 6A:
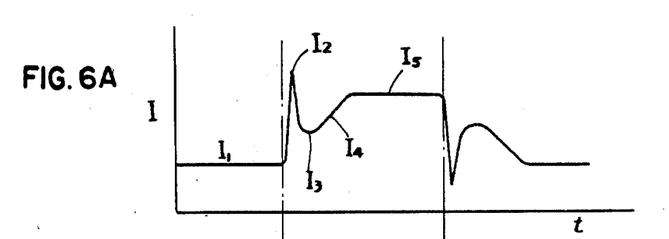
FIGS. 6a and 6b are diagrams showing the transient characteristics of the water heater according to the invention.
Figure 6B:
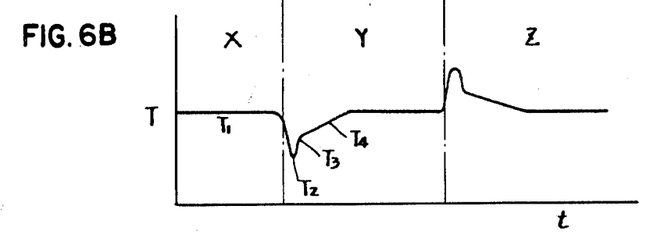

FIGS. 6a and 6b show the transient characteristics afforded by the control of the invention. The time is plotted as abscissa t. It is now assumed that a set temperature T1 is available in a state X. At this time, the value of current through the control valve 5 is I1. When the load of the heater is increased, for example, to give an increased hot water supply (state Y), the sensor 7 detects a decrease in the temperature, whereupon the differentiation circuit functions, abruptly increasing the current to I2 to restrict the decrease of temperature to a level T2. After the lapse of the differentiation time, the current decreases to a level involving the proportional gain as indicated at I3 and T3. Next, the integration circuit acts to increase the current as indicated at I4 and T4 until the difference between T3 and the original setting T1 is eliminated. The current becomes steady when the temperature of the water has returned to the original level T1. The steady current is indicated at I5. Through the operation described above, the temperature of the water invariably returns to the original set value. Further when the load is decreased, an operation reverse to the above is performed to return the temperature of the water to the set value T1.

Figure 7A:
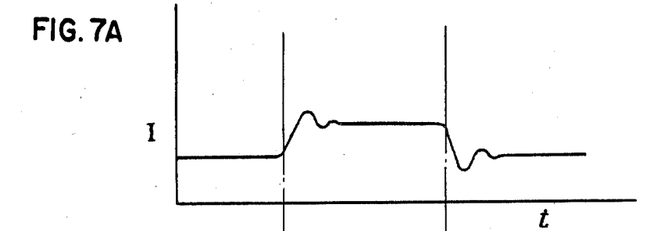
FIGS. 7a and 7b are diagrams showing the transient characteristics of the conventional proportionally controllable water heater.
Figure 7B:
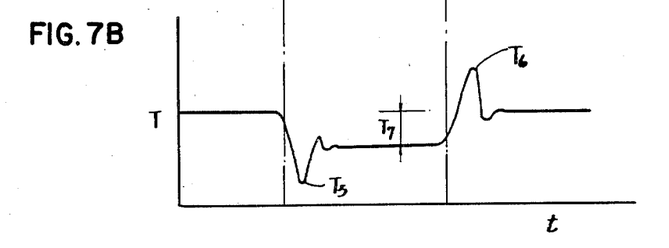

FIGS. 7a and 7b show the control characterisitics afforded by proportional control only and corresponding to FIGS. 6a and 6b. Without differentiation, the temperature overshoots greatly as indicated at T5 and T6. An offset T7 of the temperature is attributable to the absence of integration.

A second embodiment of the invention will be described. With reference to FIG. 4, it is now assumed that the heater is used at a point A' on the capacity curve with a temperature setting C'. The hot water supplied at the rate concerned has a temperature lower than C' because of the capacity of the heater. The water supply Q will then be reduced to use the heater within the control range D. With a control system including an integration circuit, the temperature of the water does not change to C' immediately but temporarily rises to D' on the curve A and thereafter falls to C'. This could be a serious hazard if the water is being used, for example, as a shower. The cause of the above phenomenon will be explained with reference to FIG. 8, in which T represents the temperature characteristics of the hot water available, and I represents the characteristics of the drive current for the proportional control valve. While the heater is being used at A', the current I is at the highest level due to the integrating operation (zone X in FIG. 8). When the water supply is altered to D, the current I gradually decreases with the integration, whereas the combustion is maintained at the maximum level before the current drops to the control range, with the result that the temperature reaches D' once and thereafter decreases to C' only when the current has reduced to the control range. Thus the temperature varies along the capacity curve in corresponding relation to the integration time delay without being controlled as intended.

Figure 9:
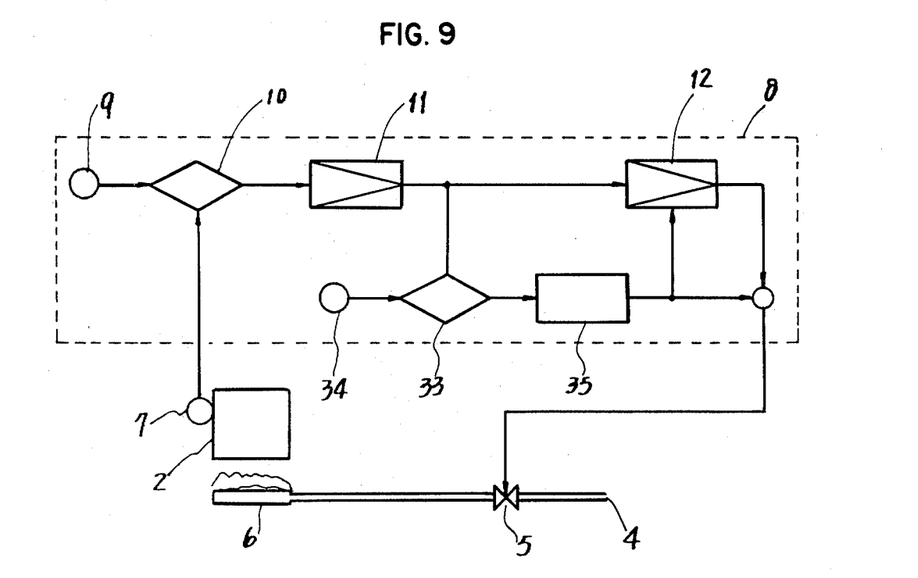
FIG. 9 is a block diagram showing a second embodiment of control circuit.
Figure 10:
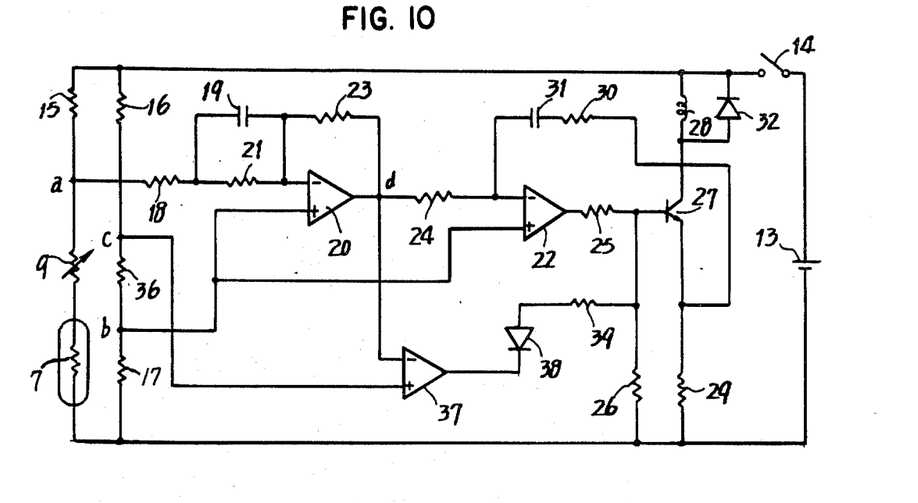
FIG. 10 is a diagram more specifically showing the circuit of FIG. 9.

FIG. 9 is a block diagram showing the second embodiment which has overcome the above drawback. The output of a proportional differentiation circuit 11 is fed to a proportional integration circuit 12 and also to a second comparator 33, in which the output is compared with a second set value 34. The output from the comparator 33 energizes a blocking circuit 35, which functions to discharge the charge of the integration circuit 12 and to temporarily block a proportional control valve 5, when the output of the differentiation circuit 11 has exceeded the set value 34 due to a rise of the temperature of a sensor 7. FIG. 10 shows the control circuit in greater detail. The second setting 34, namely, the potential at c which is made higher than the potential at b by a resistor 36 is applied to the positive input terminal of a comparator 37. The comparator 37 is of known construction. When the potential at the negative input terminal is lower than that at the positive input terminal, the comparator gives high output almost equal to the positive potential of a power supply 13. Conversely if the potential at the negative input terminal is higher than that at the positive input terminal, the comparator delivers low output equal to the negative potential of the power supply 13. The proportional differentiation output d is fed to the negative input terminal of the comparator 37.

In the usual steady state, the potentials a, b and d are all equal due to the presence of the integration circuit. Consequently d<c, and the negative input to the comparator 37 is lower than its positive input by the potential c−b. The comparator 37 therefore gives high output which is nearly equal to the potential of the power supply 13. Since the output of the comparator 37 is fed to a diode 38, which is biased in the reverse direction, a transistor 27 will in no way be influenced.

When the temperature of the sensor 7 rises, the potential a decreases, so that the proportional differentiation output d increases in a differential wave form, hence d>c. The comparator 37 is inverted to give low output. Through the diode 38 and a resistor 39, the base potential of the transistor 27 drops nearly to zero, and the transistor 27 is cut off. Since the emitter potential of the transistor 27 also drops to zero at this time, the charge in an integration capacitor 31 discharges through resistors 30 and 29. When the differentiation output d has become smaller than c, the comparator 37 is inverted again, whereby the operation of the blocking circuit 35 comprising the comparator 37 and the diode 38 is terminated.

When the heater operates to full capacity with an increase in the load, the temperature of the sensor 7 does not rise even if the largest current flows through the winding 28 of the proportional control valve as already stated, so that the potential a does not become equal to the potential b. Integration proceeds, and upon a lapse of time, the integration capacitor 31 is charged to the power supply voltage. If the load is decreased in this state, the current, which gradually reduces in accordance with the integration time constant, does not immediately decrease to an optimum value, permitting an abrupt increase in the temperature of the water because the burner operates nearly at the maximum capacity. The water will boil, entailing a serious hazard. In such an event, the blocking circuit 35 also functions to close the control valve 5 and discharge the integration capacitor within a short period of time, upon detecting the rise of the temperature. Thus the blocking circuit prevents the rise of the water temperature to the full capacity.

Figure 8:
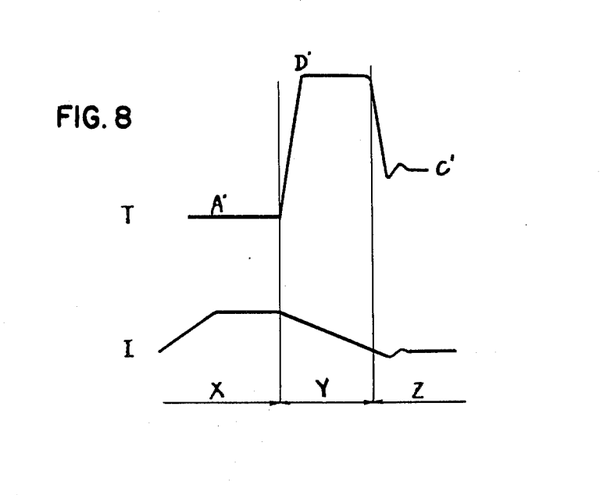
FIG. 8 is a diagram showing transient characteristics to illustrate the problem encountered when an integration circuit is used.
Figure 11:
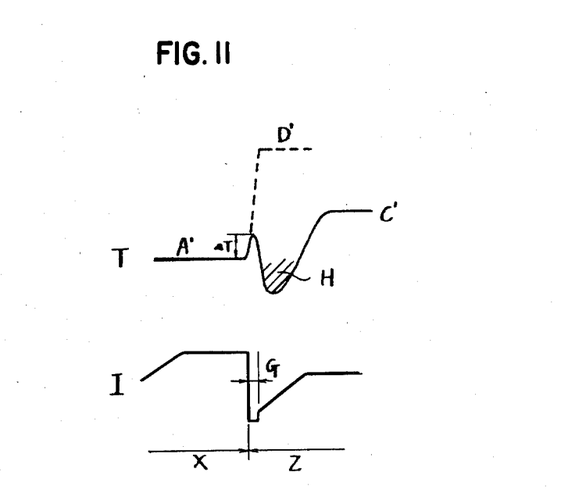
FIG. 11 is a diagram showing the transient characteristics of the circuit of FIG. 10.

FIG. 11 shows the transient characteristics under the same conditions as in FIG. 8. The blocking circuit functions upon detecting an increase ΔT in the temperature during transition from the maximum capacity range to the control range and discharges the integration capacitor for a period of time G. The current therefore temporarily decreases, and charging is initiated after the restoration of the blocking circuit. Consequently the temperature returns to C' without reaching D'.

Further with the circuit of FIG. 10, the resistor 39 serves to limit the amount of discharge of the capacitor 31 during the operation of the blocking circuit. The resistor 39, when having a suitable resistivity, acts to prevent undershoot as indicated at H in FIG. 11 and resulting from overdischarge.

The blocking circuit shown in FIG. 10 also functions to decrease the base potential of the transistor 27. While discharging the capacitor 31 during the operation of the blocking circuit, the circuit blocks the current through the winding 28 of the proportional control valve 5 to forcibly close the valve 5, whereby the overshoot due to a decrease of the load is minimized.

Figure 12:
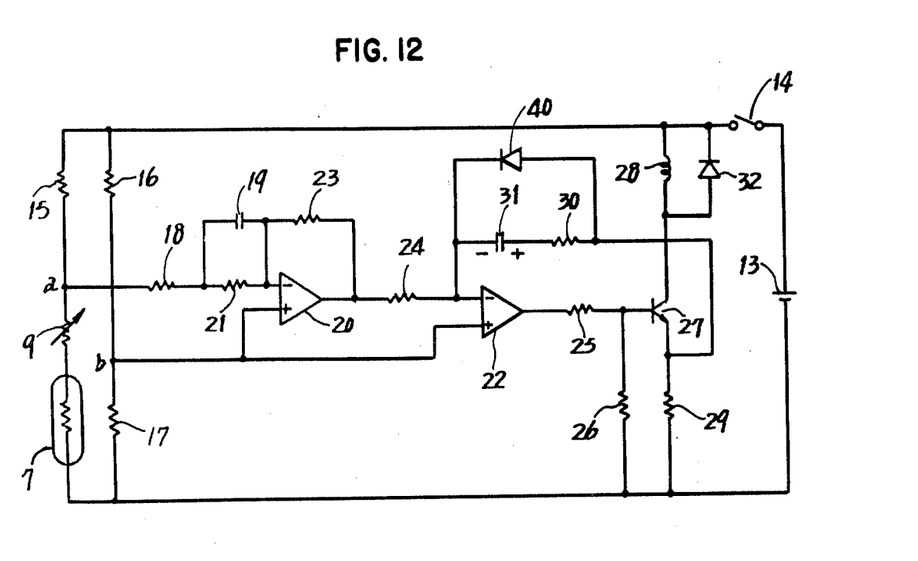
FIG. 12 is a circuit diagram showing a third embodiment.

FIG. 12 shows a third embodiment. With the embodiment of FIG. 9, the overshoot resulting from the overcharging of the integration capacitor 31 during transition from the maximum capacity range to the control range is prevented by the blocking circuit 35, whereas with the third embodiment, overcharging is prevented by limiting the charge in the integration capacitor.

Figure 13:
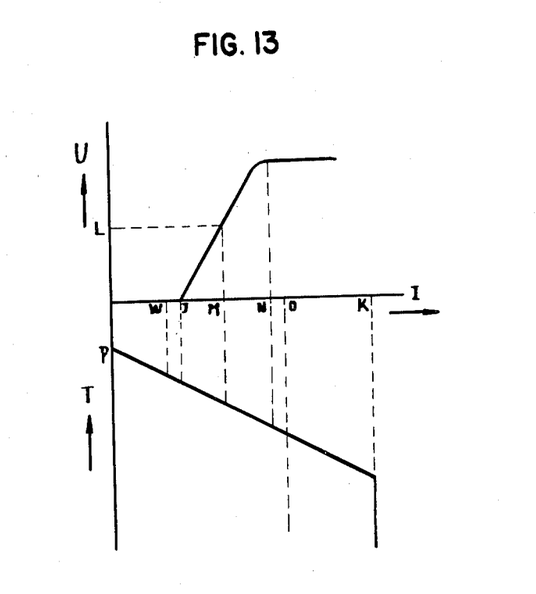
FIG. 13 is a diagram showing the relation between a proportional control valve and the operation of the circuit.

With reference to FIG. 12, a capacitor 31 is continuously charged in the direction shown while the heater is operating at its full capacity. Consequently the current through the proportional control valve increases to the value permitted by the power supply 13. FIG. 13 shows the characteristics involved. The value of the current through the winding 28 of the proportional control valve is plotted as abscissa I vs. the gas flow rate as ordinate U and the temperature of hot water as ordinate T. The T-I characteristics are the control circuit characteristics, and the I-U characteristics are the characteristics of the control valve 5. The largest current of the circuit is indicated at K. At a current value N or higher, the valve 5 gives the largest flow rate. While the heater is operating to full capacity, the control circuit provides a current K. When the control range is reached with a reduction in the load (from A' to D in FIG. 4), the current is limited to M which affords an optimum gas flow rate L, but the current will not reduce instantaneously due to a time delay involved in the integration circuit. During this time delay, excessive combustion takes place, permitting full-capacity operation of the heater until the current decreases to N. Accordingly it is desired to shorten to the greatest possible extent the time taken for the decrease from K to N.

For this purpose, the circuit of FIG. 12 includes a diode 40 to provide a bypass therethrough when the drop of voltage across the resistor 30 and capacitor 31 becomes larger than the forward voltage drop $V_F$ of the diode 40. Consequently the charge in the capacitor 31 is variable below $V_F$, but the capacitor will not be charged above $V_F$, thereby limiting the maximum current through the control valve to a value thus determined (point O in FIG. 13). Various constants are also so determined that $V_F$ is approximate to the maximum current O. This construction shortens the time taken for the transition from the maximum capacity range to the control range even if the integration time remains the same, further reducing the attendant rise of the temperature of the water.

Figure 14A:
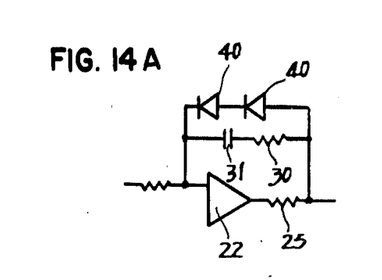
FIGS. 14a to 14d are circuit diagrams each showing an integration circuit portion as a modification of the embodiment of FIG. 12.
Figure 14B:
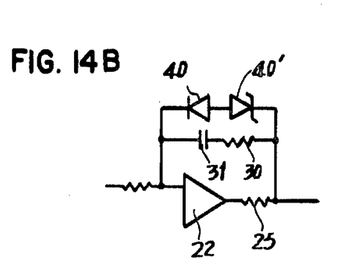

In view of the relation between the largest current O and $V_F$, a plurality of diodes 40 may be provided in series, or a Zener diode 40' may be additionally provided in a direction reverse to the diode 40 (FIGS. 14a and 14b).

Figure 14C:
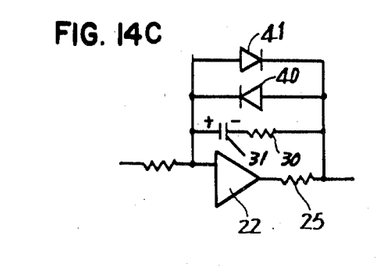
Figure 14D:
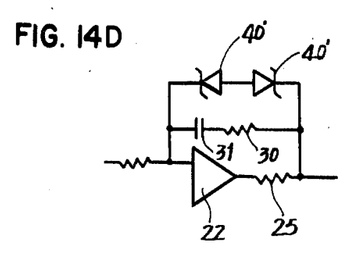

The same is true of the case in which the load is increased. In FIG. 13, the proportional control valve starts to open at a current value J. When the current increases from zero (point P) to M with increasing load, the current increase takes place in accordance with the integration time constant, entailing an increase in the temperature of the water. Accordingly if the smallest current value is limited to W, the time taken for the current to increase from W to M is shorter than is the case with the increase from zero to M. This serves to reduce the decrease in the temperature involved. For this purpose, it is possible to connect a diode 41 in parallel with the diode 40 in a reverse direction thereto as seen in FIG. 14c to limit the charge in the capacity 31 in the direction shown. Similarly Zener diodes 40' are usable as seen in FIG. 14d.

Figure 15:
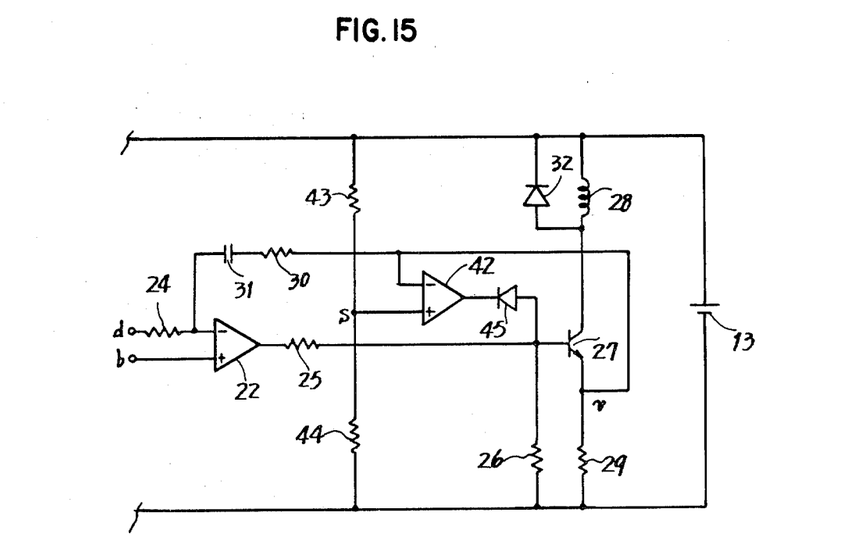
FIG. 15 is a fragmentary circuit diagram showing a fourth embodiment.

FIG. 15 shows a fourth embodiment having the same function as the embodiment of FIG. 12. The emitter potential v of a transistor 27 is applied to the negative input terminal of an operation amplifier 42. A divided potential s afforded by resistors 43 and 44 is applied to the positive input terminal of the amplifier 42. The output of the amplifier is fed to the base of the transistor 27 via a diode 45. When the current through the winding 28 of the proportional control valve increases, the potential v increases, but if there is the tendency for the potential v to become larger than s, the operation amplifier gives reduced output, and the base current of the transistor 27 flows through the diode 45. Consequently the potential will not exceed the potential s. Thus a voltage follower circuit is provided for giving such an output signal that the negative input to the amplifier 42 will be equal to the positive input thereto at all times. The voltage follower circuit nevertheless is biased in the reverse direction by the diode 45 and is held out of operation when v<s, permitting the overall circuit to function properly. Accordingly the potential s in the circuit can be designed so as to give the current value 0 in FIG. 13. This assures higher precision than is the case with the circuit of FIG. 12. The minimum current (W in FIG. 13) can be afforded with ease similarly.

Thus the third and fourth embodiments control large and small currents outside the control range and also limit the amount of integration, thereby reducing the delay involved in response to ensure improved control characteristics. The blocking circuit shown in FIG. 9 can be incorporated into these circuits.

Figure 16:
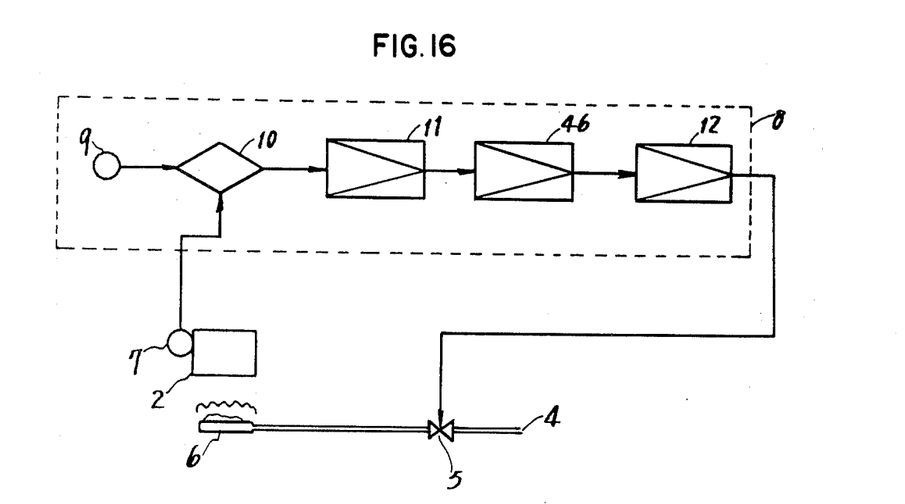
FIG. 16 is a block diagram showing a fifth embodiment of control circuit.

FIG. 16 is a block diagram showing a fifth embodiment. The output of a proportional differentiation circuit 11 (hereinafter referred to as "first differentiation circuit") is fed to a second differentiation circuit 46, the output of which is applied to a proportional integration circuit 12. The output of the first differentiation circuit 11 is therefore differentiated again.

Figure 17:
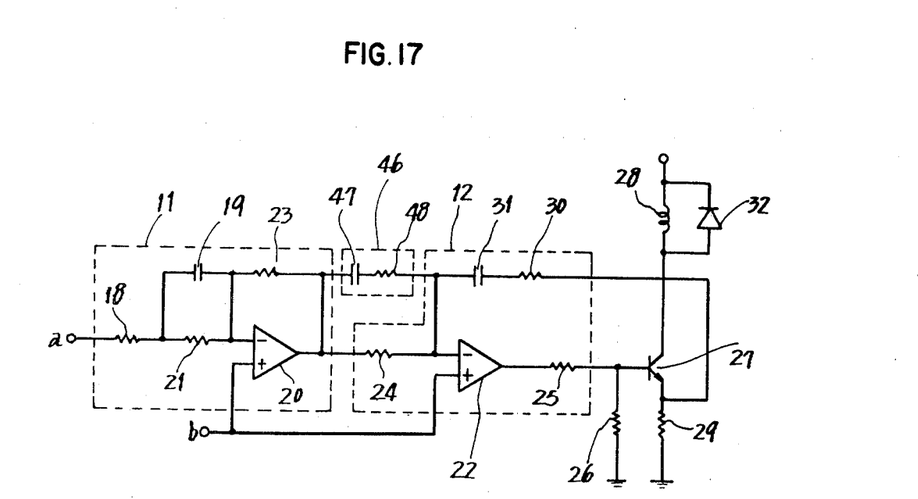
FIG. 17 is a diagram showing the main portion of the circuit of FIG. 16 in greater detail.

FIG. 17 shows the main portion of the circuit in greater detail. The differentiation output from an operation amplifier 20 is charged in a capacitor 47 as the input of an operation amplifier 22 to obtain a further differentiated output with the gain of parallel resistors 24 and 48 and a resistor 30. On completion of the charging of the capacitor 47, the output returns to the gain determined by the resistors 30 and 24. In this way the first differentiation output is differentiated once again.

Figure 18A:
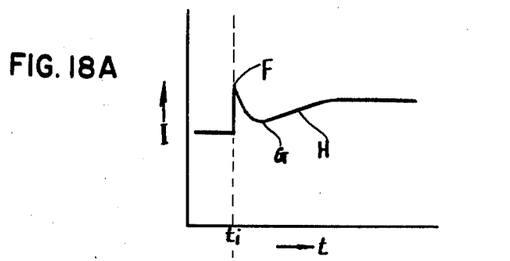
FIGS. 18a and 18b are diagrams showing the transient characteristics of a water heater before the circuit of FIG. 16 is used.
Figure 18B:
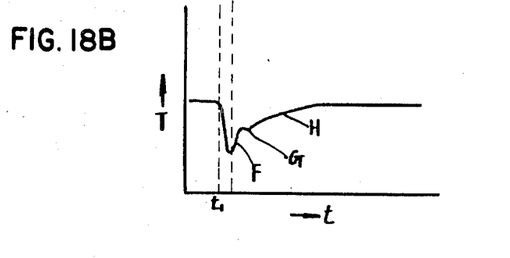
Figure 19A:
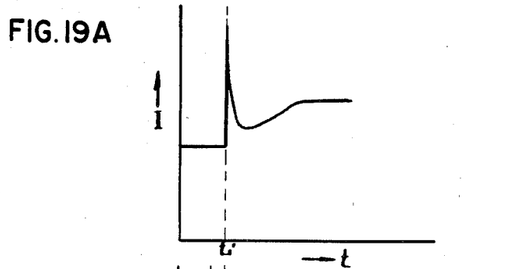
FIGS. 19a and 19b are diagrams showing the transient characteristics of the same during the use of the circuit of FIG. 16.
Figure 19B:
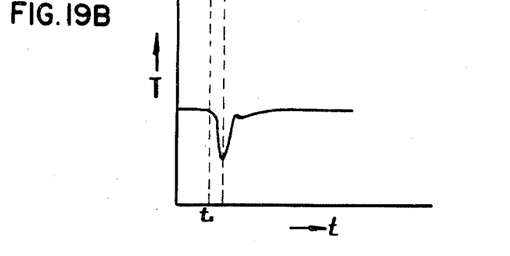

FIGS. 19a and 19b show the transient characteristics given by the circuit. For comparison, FIGS. 18a and 18b show the characteristics provided by a single-stage proportional differentiation circuit (i.e. the circuit of FIG. 2). In FIGS. 18a and 18b, the time is plotted as abscissa t vs. the current for driving the proportional control valve 5 as ordinate I and the temperature of the hot water from the heater as ordinate T. The figures show the characteristics of the circuit when the temperature of the sensor has decreased at time t1 due to an increase in the load. With a time delay t1' involved in the heater, the sensor detects the temperature, which is abruptly raised with differentiation output, and is further corrected to the original temperature over a period of integration time H after the current has been returned to a proportional gain G. However the amount of differentiation is small whereas the integration provides great correction, so that the return of the water temperature to the original level requires some time, during which the temperature of water remains lower and causes a discomfort. Further if the transient characteristics involve a rise of the temperature, there is the hazard of burning. A high differentiation gain, if used, gives large differentiation output which entails hunting even if the deviation of temperature is not very large. Therefore, the differentiation gain should not be very high. With FIGS. 19a and 19b, the output of the first differentiation circuit 11 is further differentiated in the second differentiation circuit 46, with the result that the current value greatly increases at time t1' to raise the temperature of water close to the original level. In this case, the correction of the temperature by the integration circuit 12 is smaller, and the duration of the variation of temperature is shorter.

Although the peak value of the first differentiation output is proportional to the deviation of temperature, the peak value of the second differentiation output varies quadratically relative to the temperature deviation, such that a large deviation gives a very large peak value but a small deviation results in an extremely small peak value. Accordingly the opposite differentiation output that would result from excessively large differentiation output relative to the temperature can be effectively minimized to inhibit hunting.

Briefly, the water heater embodying the invention is provided with a proportional, integrating and differentiating control circuit comprising operation amplifiers for controlling the amount of combustion to supply hot water at a constant temperature, so that the variation of temperature due to a variation in the load can be detected in terms of differentiation output. The control circuit therefore assures quick response and has improved transient characteristics. The integration circuit included eliminates the offset of the temperature of water resulting from the variation of the load.

The blocking circuit provided for detecting the overshoot resulting from a reduction in the load and forcibly reducing the amount of integration functions to shorten the duration of overshooting to assure improved safety.

The circuit provided for limiting the discharge of the integration capacitor during the operation of the blocking circuit eliminates the undershoot that would otherwise result from overdischarge so as to render the hot water usable free of any discomfort.

The circuit provided for closing the proportional control valve simultaneously with the operation of the blocking circuit to stop combustion serves to lower the peak temperature of overshoot attendant on the reduction of the load.

The circuit for limiting the amount of integration prevents overcharging of the integration capacitor during the full-capacity operation of the heater, thus precluding the occurrence of hazardous overshooting.

The second differentiation circuit for further differentiating the differentiation output assures stable control and still improved transient characteristics when the load is altered.

With these various advantages, the combustion control system of this invention is useful for water heaters which are convenient to use especially for a shower bath and which assure safety free of any hazards such as burning. Furthermore the present invention is applicable to other apparatus for heating fluid which is continuously fed thereto.

We claim:

1. A combustion control system comprising:
   a combustion unit for a fuel;
   a porportional control valve for proportionally controlling the supply of the fuel to the combustion unit;
   a temperature sensor for detecting the temperature of a fluid heated with the heat of combustion produced by the combustion unit; and
   a control circuit comprising a bridge circuit including the temperature sensor as a component thereof, a proportional integrating differentiating circuit comprising a proportional differentiating circuit including an operation amplifier and a proportional integrating circuit including an operation amplifier and an integration capacitor, the proportional integrating differentiating circuit being adapted to receive an output from the bridge circuit representative of a deviation of the fluid temperature from a first temperature setting and to give a drive output to the proportional control valve, and a discharging circuit including a comparator for comparing an output from the differentiating circuit with a second temperature setting and adapted to cause discharge of a charge from the integration capacitor when the comparison in the comparator indicates that the fluid temperature exceeds a specified level.

2. A combustion control system as defined in claim 1 wherein the discharging circuit has a circuit for limiting the amount of the charge to be discharged from the integration capacitor.

3. A combustion control system as defined in claim 1 wherein the discharging circuit functions to close the proportional control valve in timed relation with the discharging.

4. A combustion control system as defined in claim 1 wherein the control circuit has an integration limiting circuit for limiting the amount of the charge to be charged in the integration capacitor.

5. A combustion control system as defined in claim 1 wherein the proportional integrating differentiating circuit comprises a second differentiation circuit for differentiating the output of the first differentiation circuit.

* * * * *